(12) United States Patent
Lanzone et al.

(10) Patent No.: US 9,118,585 B2
(45) Date of Patent: Aug. 25, 2015

(54) RESIZING EXISTING TRAFFIC FLOW IN OPTICAL TRANSPORT NETWORK

(75) Inventors: Sergio Lanzone, Genoa (IT); Annamaria Fulignoli, Latina (IT); Antonio Tartaglia, Latina (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 424 days.

(21) Appl. No.: 13/284,146

(22) Filed: Oct. 28, 2011

(65) Prior Publication Data

US 2013/0101292 A1 Apr. 25, 2013

(30) Foreign Application Priority Data

Oct. 20, 2011 (WO) ................ PCT/EP2011/068309

(51) Int. Cl.
*H04L 12/825* (2013.01)
*H04J 3/16* (2006.01)
*H04L 12/801* (2013.01)

(52) U.S. Cl.
CPC ............ *H04L 47/25* (2013.01); *H04J 3/1652* (2013.01); *H04L 47/17* (2013.01); *H04L 47/33* (2013.01); *H04L 47/35* (2013.01)

(58) Field of Classification Search
CPC ....... H04J 3/1652; H04L 47/25; H04L 47/33; H04L 47/35; H04L 47/17
USPC .............................. 370/254, 237, 468; 398/52
See application file for complete search history.

(56) References Cited

U.S. PATENT DOCUMENTS

| | | | |
|---|---|---|---|
| 6,963,538 B1 * | 11/2005 | Giroux et al. ............ | 370/236.1 |
| 7,852,771 B2 * | 12/2010 | Ashwood-Smith .......... | 370/238 |
| 2001/0019554 A1 * | 9/2001 | Nomura et al. ............. | 370/389 |
| 2001/0055314 A1 * | 12/2001 | Suzuki et al. .............. | 370/468 |
| 2002/0006110 A1 | 1/2002 | Brezzo et al. | |
| 2004/0085904 A1 | 5/2004 | Bordogna et al. | |
| 2007/0255954 A1 * | 11/2007 | Struik ......................... | 713/171 |

(Continued)

FOREIGN PATENT DOCUMENTS

| | | |
|---|---|---|
| CA | 2765104 A1 * | 12/2010 |
| EP | 1838054 A1 * | 9/2007 |
| EP | 2106051 | 9/2009 |

OTHER PUBLICATIONS

PCT International Search Report for PCT Counterpart Application No. PCT/EP2011/068309, (Oct. 10, 2012), 4 pages.

(Continued)

*Primary Examiner* — Alpus H Hsu
*Assistant Examiner* — Anthony Luo
(74) *Attorney, Agent, or Firm* — Nicholson De Vos Webster & Elliott, LLP

(57) ABSTRACT

In an optical transport network a traffic flow comprises data grouped into a number of resizable data units, encapsulated by optical transport frames, each having a frame overhead. A rate of the traffic flow is changed by changing the data unit overhead and changing at the source node the frame overhead to indicate a change in rate of an optical signal carrying the traffic flow. An optical transmission part is tuned to transmit at the new rate, and at any intermediate nodes along the route the indication of the change in rate is detected in the frame overhead so that the traffic flow on a next optical link is transmitted at the new rate. Thus optical bandwidth allowed for enlarging the data units, can be saved, and electrical processing of data units at the nodes can be simplified, reducing power consumption.

19 Claims, 10 Drawing Sheets

(56) References Cited

U.S. PATENT DOCUMENTS

| | | |
|---|---|---|
| 2008/0219168 A1* | 9/2008 | Enomoto et al. ............. 370/237 |
| 2009/0285097 A1 | 11/2009 | So et al. |
| 2011/0141891 A1 | 6/2011 | So |
| 2011/0222412 A1 | 9/2011 | Kompella |
| 2012/0002965 A1* | 1/2012 | Bellato et al. .................. 398/52 |
| 2012/0020248 A1* | 1/2012 | Granlund et al. ............. 370/254 |

OTHER PUBLICATIONS

"Characteristics of optical transport network hierarchy equipment functional blocks", *Series G: Transmission Systems and Media, Digital Systems and Networks, ITU-T G.798*, (Dec. 2012), 397 pages.

"Hitless adjustment of ODUflex(GFP)" *Recommendation ITU-T G.7044/Y.1347*, (Oct. 2011), 44 pages.

"Interfaces for the optical transport network", *Recommendation ITU-T G.709/Y.1331*, (Feb. 2012), 238 pages.

Berger, L., "Generalized Multi-Protocol Label Switching (GMPLS) Signaling Functional Description" *Network Working Group, Request for Comments: 3471, The Internet Society*, http://tools.ietf.org/html/rfc3471, (Jan. 2003), 35 pages.

Papadimitriou, D., et al., "Generalized Multi-Protocol Label Switching (GMPLS) Signaling Extensions for G.709 Optical Transport Networks Control", *Network Working Group Request for Comments: 4328, The Internet Society (2006)*, (Jan. 2006), 23 pages.

\* cited by examiner

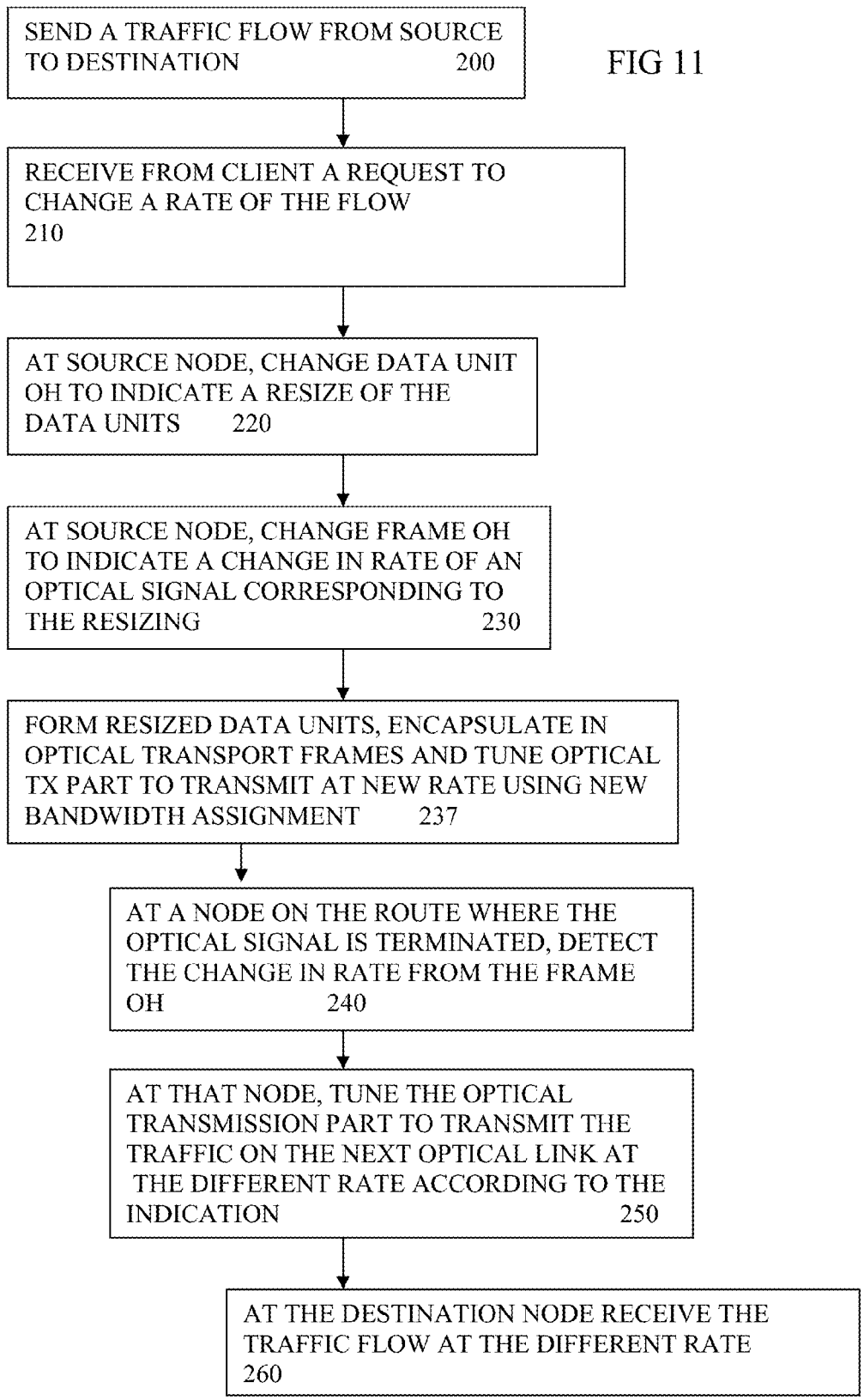

RESIZING EXISTING TRAFFIC FLOW IN OPTICAL TRANSPORT NETWORK

CROSS-REFERENCE TO RELATED APPLICATIONS

This application claims the benefit of International Application No. PCT/EP2011/068309, filed Oct. 20, 2011, which is hereby incorporated by reference.

FIELD

The present invention relates to methods of operating an optical transport network, to methods of operating a source node of such a network, to methods of operating an intermediate node of such as network, to nodes operable as source nodes, to nodes operable as intermediate nodes, and to corresponding computer programs.

BACKGROUND

Communications networks such as optical networks often employ wavelength division multiplexing (WDM) or dense wavelength division multiplexing (DWDM) to increase transmission capacity. In WDM and DWDM networks, a number of optical channels are carried in a single fiber at disparate wavelengths. Network capacity is based on the number of wavelengths, or channels, in each fiber and the bandwidth, or size of the channels. In WDM, DWDM and other optical networks, arrayed waveguide gratings (AWGs), interleavers, and/or fiber gratings (FGs) can be used to add and drop traffic at network nodes and to multiplex and demultiplex traffic at network nodes. To enable reconfiguring the wavelength paths to be dropped or added at different nodes, network nodes having optical switches can be provided, known as all optical ROADM (Reconfigurable Optical Add Drop Multiplexer) nodes.

DWDM networks typically use more network elements than earlier point to point optical links, for example—optical amplifiers, multiplexers, demultiplexers, and dispersion compensation units, which can bring reliability concerns and warrant monitoring. Thus there was a need for transmitting overhead information for management and for protection schemes to recover from equipment failures. As a result, the G.709 Optical Transport Network, or OTN standard was generated by the International Telecommunication Union Telecommunication Standardization (ITU-T) to provide management functionality for DWDM optical networks. OTN involves adding a frame of overhead information, (also called a digital wrapper), some to the front of the signal as a header, and some such as FEC (Forward Error Correction) as a trailer appended to the rear. The FEC can extend optical span distances by reducing bit error rates (BERs).

The G.709 standard framing involves amongst others an ODU overhead, as well as an OTU overhead.

The OTN hierarchy, based on ITU-T G.709, has just evolved in order to cope with the present and future requirements in terms of new CBR and packet clients to be transported in the optical backbones of the telecom operators. In order to avoid the proliferation of new ODUk containers, specified to transport possible future clients, and in order to build a "future proof" OTN Network ITU-T (in particular SG15 Q11) has defined a new type of ODU container: the ODUflex. The ODUflex has been included in the last revision of G.709.

The ODUflex has the following main characteristics:
The OPUflex/ODUflex frame structure is the same as the one already defined for the other ODUk (k=0, 1, 2, 3, 4);
Any new CBR clients 1.238 G will be mapped into ODU0. Clients>1.238 G and less than or equal to 2.488320 G will be mapped into ODU1.
CBR clients, supra-2.488 Gbit/s (with bit rate tolerances up to ±100 ppm)—except CBR2G5, CBR10G and CBR40G, whose mapping is already defined in ODU1, ODU2 and ODU3—will be mapped into ODUflex via bit-synchronous mapping (BMP);
New "packet" clients or VLAN will be mapped into ODUflex via GFP-F;
ODUflex signals have to be transported through the optical network over an HO-ODUk (i.e. ODU2, ODU3 and ODU4) signals and then via the relevant OTUk through the Line. The ODUflex is mapped into the HO-OPUk using GMP (i.e. Generic Mapping Procedure).

Furthermore ITU-T has defined a resizing protocol to improve the ODUflex flexibility. This protocol is defined in the G.Hao/G.7044 recommendation. As per LCAS in SDH, this protocol will allow resizing of the dimension of the ODUflex when the quantity of the traffic to be transported increases or decreases during the "life" of the ODUflex.

At the moment the most interesting application for the ODUflex seems to be the transport of selected stream of packets inside the optical network. For instance the traffic associated with a particular customer/application, identified by a particular VLAN, can be mapped inside a specific ODUflex. From that moment, that traffic can be independently routed inside an Optical transport network designed according to G.798 (i.e. a network made by DWDM equipments and ODUk cross-connects, where the ODUk cross-connects are able to switch ODUflex) without the need to go down to packet level every time that traffic has to be re-routed.

SUMMARY

Embodiments of the invention provide improved methods and apparatus. According to a first aspect of the invention, there is provided a method of operating an optical transport network having the steps of sending a traffic flow along a route through nodes of the optical transport network from a source node to a destination node over one or more optical links. The traffic flow comprises data grouped into a number of resizable data units, each data unit having a data unit overhead, at least some of the nodes having switches arranged to route the data units, a number of the data units being encapsulated by optical transport frames, each having a frame overhead associated with the optical link carrying the traffic flow. Changing a rate of the traffic flow involves, at the source node, changing the data unit overhead to indicate a resize of the data units to any of the switches along the route, and changing at the source node the frame overhead to indicate a change in rate of an optical signal carrying the traffic flow to any nodes along the route which terminate an optical link, the change in rate corresponding to the resize of the data units. Also, at the source node, the data of the traffic flow is grouped into the resized data units, which are encapsulated with optical transport frames. This can be carried out directly instead of needing the intermediate encapsulation into a high-order data unit with fixed size as specified in ITU-T G.709. An optical transmission part is tuned to transmit the frames in an optical signal at the new rate. At any intermediate nodes along the route where the optical signal is terminated, the indication of the change in rate is detected in the frame overhead. The optical transmission part of that intermediate node is tuned to transmit the traffic flow on a next optical link along the route at the new rate according to the indication of the change in rate. A benefit of tuning the optical transmission to transmit the optical signal at a different rate corresponding to the resizing of the data units is that optical bandwidth allowed for enlarging the data units, can be saved for use by other traffic flows. Also, electrical processing of data units at the nodes can be simplified because there is no longer a need for nodes to calculate how to fill a fixed size of a high order data unit with the different sizes of data units. Thus the large power consumption of such high speed electrical processing can be reduced, as can the chip size and cost. See FIGS. 1 and 2.

Any additional features can be added or can be disclaimed, some are described below. At least some of the optical links of the network can have a flexible grid of bandwidth assignments, and there can be a step of reassigning the bandwidth according to the indicated change in rate. A benefit is more efficient use of spectrum. See FIG. 11 for example.

The tuning step can comprise any one or more of changing a modulation format, changing a baud rate, and changing a number of sub carriers used in a multi-carrier modulation format. A benefit is that these can be tuned relatively quickly. See FIG. 2 for example.

The resizable data units can have a structure according to G.709 ODUflex. A benefit is compatibility with existing equipment and nodes. See FIGS. 6, 7 and 10 for example.

There can be a step of checking that all the nodes can carry out the change in rate. Before transmitting the frames at the new rate from the source node, there can be steps of sending the indication of the change in rate to all the nodes along the route, checking at each node that there is the capability for the new rate, and waiting until the source node receives an acknowledgement from the destination node that all nodes have the capability. A benefit is a reduction of the chance of the introduction of the new rate causing a fault and thereby disrupting the traffic flow. See FIG. 4 for example.

There can be a step of changing the frame overhead by adding resize control overhead, and the step of checking can be carried out in a hitless manner according to G.Hao-G.7044 adapted to use the resize control overhead in the frame overhead. A benefit of this is that the change of rate is better controlled and more compatible with existing nodes. See FIGS. 4, 7, 8 and 9 for example.

The ODUflex units can be directly multiplexed into the optical transport frames without an intermediate higher order multiplexing. A benefit is that an amount of digital processing can be reduced significantly by avoiding the need for such higher order multiplexing. See FIG. 10 for example.

The indication of the change in rate can comprise a new number of trib slots (TSNUM), and the step of detecting the indication of the new rate can have the steps of detecting the new number of trib slots and using the new number of trib slots to determine the new rate. A benefit is that the nodes can each match the optical signal rate to the resize more easily. See FIGS. 9 and 10 for example.

Another aspect of the invention provides a method of operating a source node of an optical transport network having the steps of sending a traffic flow along a route through nodes of the optical transport network from the source node to a destination node over one or more optical links, the traffic flow comprising data grouped into a number of resizable data units, each data unit having a data unit overhead, at least some of the nodes having switches arranged to route the data units, a number of the data units being encapsulated by optical transport frames, each having a frame overhead associated with the optical link carrying the traffic flow, and changing a rate of the traffic flow. This can be done by at the source node, changing the data unit overhead to indicate a resize of the data units to any of the switches along the route, and changing at the source node the frame overhead to indicate a change in rate of an optical signal carrying the traffic flow to any nodes along the route which terminate an optical link, the change in rate corresponding to the resize of the data units. Then at the source node there are steps of grouping the data of the traffic flow into the resized data units, encapsulating the resized data units with optical transport frames and tuning an optical transmission part to transmit the frames in an optical signal at the new rate.

Another aspect provides a method of operating an intermediate node of an optical transport network in which a traffic flow has been sent along a route through nodes of the optical transport network from a source node to a destination node over one or more optical links, the traffic flow comprising data grouped into a number of resizable data units, each data unit having a data unit overhead, at least some of the nodes having switches arranged to route the data units, a number of the data units being encapsulated by optical transport frames, each having a frame overhead associated with the optical link carrying the traffic flow, and a rate of the traffic flow has been changed by changing the data unit overhead to indicate a resize of the data units to any of the switches along the route, and changing the frame overhead to indicate a change in rate of an optical signal carrying the traffic flow to any nodes along the route which terminate an optical link, the change in rate corresponding to the resize of the data units. The method has the steps of detecting at the intermediate node along the route, the indication of the change in rate in the frame overhead and tuning an optical transmission part of that intermediate node to transmit the traffic flow on a next optical link along the route at the new rate according to the indication of the change in rate.

Another aspect provides a node for an optical transport network operable as a source node for a traffic flow along a route through nodes of the optical transport network from the source node to a destination node over one or more optical links, the traffic flow comprising data grouped into a number of resizable data units, each data unit having a data unit overhead, at least some of the nodes having switches arranged to route the data units, a number of the data units being encapsulated by optical transport frames, each having a frame overhead associated with the optical link currently carrying the traffic flow. The node has a data unit processor arranged to respond to a request to change a rate of the traffic flow by changing the data unit overhead to indicate a resize of the data units to any of the switches along the route, and a framer arranged to change the frame overhead to indicate a change in rate of an optical signal carrying the traffic flow to any nodes along the route which terminate an optical link, the change in rate corresponding to the resize of the data units. There is also a tunable optical transmission part arranged to transmit the traffic flow on a next optical link along the route at a different rate according to the indication of the change in rate.

Another aspect provides a node for an optical transport network operable as an intermediate node for a traffic flow along a route through nodes of the optical transport network from a source node to a destination node over one or more optical links, the traffic flow comprising data grouped into a number of resizable data units, each data unit having a data unit overhead, at least some of the nodes having switches arranged to route the data units, a number of the data units being encapsulated by optical transport frames, each having a frame overhead associated with the optical link currently carrying the traffic flow. The node has a data extract part arranged to detect an indication in the data unit overhead of an incoming traffic flow to indicate a resize of the data units, a frame reader arranged to detect in the frame overhead of the incoming traffic flow an indication of a change in rate of an optical signal carrying the traffic flow, the change in rate corresponding to the resize of the data units, and a tunable optical transmission part arranged to transmit the traffic flow on a next optical link along the route at a different rate according to the detected indication of the change in rate.

The tunable optical transmission part can be tunable by changing any one or more of: a modulation format, a baud rate, and a number of sub carriers used in a multi-carrier modulation format. The node can be arranged so that before transmitting the frames at the new rate, the node sends the indication of the change in rate to all the nodes along the route, and waits until it receives an acknowledgement from the destination node that all nodes have the capability.

The changed frame overhead can comprise resize control overhead, and the node can be arranged to check it has a capability corresponding to the new rate, and if so, to pass on the changed frame overhead to a next node.

The node can be arranged to carry out the checking in a hitless manner according to G.Hao-G.7044 adapted to use the resize control overhead in the frame overhead.

The resizable data units can have a structure according to G.709 ODUflex, and can be directly multiplexed into the optical transport frames without an intermediate higher order multiplexing.

The node can have a switch for switching the traffic flow according to the data unit overhead.

Any of the additional features can be combined together and combined with any of the aspects. Other effects and consequences will be apparent to those skilled in the art, especially over compared to other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which:

FIG. 11 shows some steps carried out by the nodes according to another embodiment involving changing a bandwidth assignment.

DESCRIPTION OF EMBODIMENTS

Figure 1:
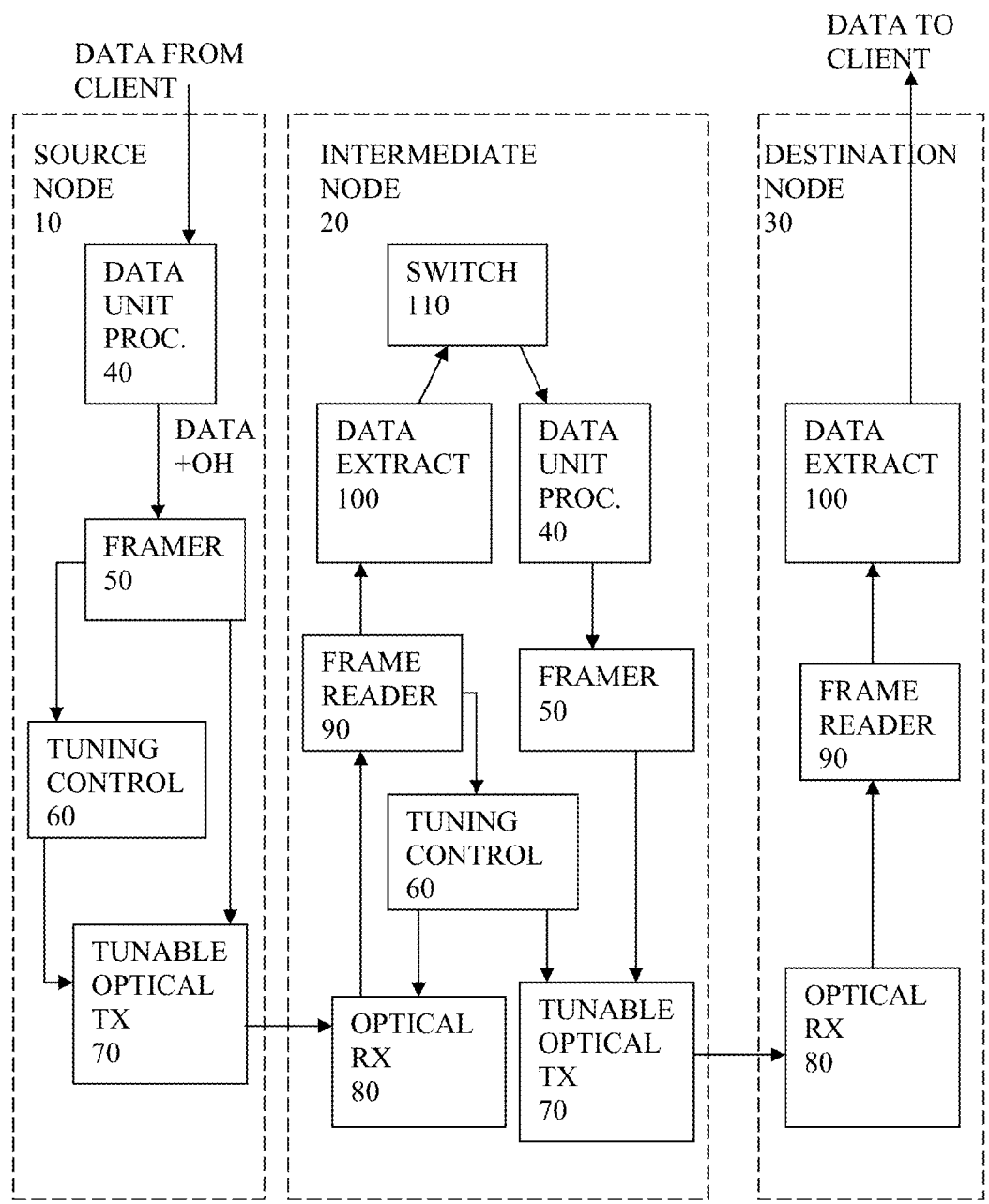
FIG. 1 shows a schematic view of source, intermediate and destination nodes according to an embodiment.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn to scale for illustrative purposes.

Definitions:

Where the term "comprising" is used in the present description and claims, it does not exclude other elements or steps and should not be interpreted as being restricted to the means listed thereafter. Where an indefinite or definite article is used when referring to a singular noun e.g., "a" or "an", "the", this includes a plural of that noun unless something else is specifically stated.

Elements or parts of the described nodes or networks may comprise logic for performing information processing as described herein and/or instructions encoded in media for performing information processing as described herein when the instructions are executed by a processor. The logic and/or instructions may comprise software encoded in a disk or other computer-readable medium including non-transitory, computer readable storage medium and/or instructions encoded in an application specific integrated circuit (ASIC), field programmable gate array (FPGA), or other processor or hardware.

References to nodes can encompass any kind of switching node, not limited to the types described, not limited to any level of integration, or size or bandwidth or bit rate and so on.

References to software can encompass any type of programs in any language executable directly or indirectly on processing hardware.

References to processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example.

Abbreviations
ASICs Application Specific Integrated Circuits
FPGAs Field Programmable Gate Arrays
GMPLS Generalised multiple protocol label switched
IETF Internet Engineering Task Force
LSP Label Switched Path
NE Network Element
NMS Network Management System
ROADM Reconfigurable Optical Add Drop Multiplexer/demultiplexer
RSVP Resource Reservation Protocol
RWA Routing and Wavelength Assignment
WSON Wavelength Switched Optical Network
WSS Wavelength Switching Section
CBR Constant Bit Rate
GFP Generic Framing Procedure
GMP Generic Mapping Procedure
HAO Hitless Adjustment of ODUflex LCR Link Connection Resize
HO-ODUk High Order ODUk
ODUflex Flexible Optical Data Unit
ODUk Optical Data Unit
OH Overhead
OPUflex Flexible Optical Payload Unit
OPUk Optical Payload Unit
OTN Optical Transport Network
OTUflex Flexible OTU
OTUk Optical Transport Unit
RCOH Resize Control Overhead
RES Reserved
RP Resizing Protocol
TPID Tributary Port ID
TS Tributary Slot
TSCC Tributary Slot Connectivity Check
TSGS Tributary Slot Group Status
TSNUM Tributary Slot Number
  References
ITU-T G.709: Interfaces for the Optical Transport Network (OTN)
ITU-T G.Hao/G.7044: Hitless adjustment of ODUflex
  Introduction By way of introduction to the embodiments, how they address some issues with conventional designs will be explained. Using the current techniques, even if the ODUflex can be resized to fit the effective amount of traffic to be transported, the line signal (i.e. OTUk) that physically transports the ODUflex in the network is always working at the same bit-rate regardless of the effective bit-rate of the ODUflex is transported inside.

This solution is not optimal (unless you can saturate the OTUk aggregating capacity by effectively multiplexing many low-capacity ODUflex/LO-ODUk).

First of all the power consumption of the Line card will be always the same as the card that receive/send the OTUk with the ODUflex inside will work always at the same bit rate (i.e. the OTUk bit rate) even if the ODUflex inside is transporting very little data. For instance an OTU3 deputed to transport an ODUflex via an intermediate HO-ODU3 will always have the OTU3 bit-rate (≈43 G) regardless of the ODUflex bit-rate.

Secondly, as the ODUflex is transported via an intermediate mapping into an HO-ODUk, the Line card will always have to terminate and process the intermediate HO-ODUk OH. This means additional digital processing which uses power and takes up space.

While the flexibility stops at ODU level, there will always be optical "pipes" only partially saturated in transport networks. In terms of DWDM transport networks, having a higher-order OTU container that is not completely full means that portions of the fiber spectrum allocated for transmission won't actually be used to transmit information.

Work is being done towards improvement of spectral efficiency in DWDM transmission using "gridless" DWDM infrastructures to remove guard-bands associated with fixed ITU-T wavelength grids, but until now the existing OTU hierarchy does not exploit such flexible infrastructure.

New OTUk Signal According to an Embodiment

The possibility of using a flexible OTUk signal, changing the bit-rate according to the bit-rate of the ODUflex that is transported inside without the need to have an intermediate HO-ODUk layer can enable:
  tuning of the optical module to work at the optimized bit-rate reducing power; and,
  avoiding the need for the HO-ODUk digital blocks used for the processing of the intermediate HO-ODUk.

This enables a saving of space in the dimension of the Framer FPGA of the Line card. As a consequence there can be power consumption reduction and cost saving.

"Gridless" optically switched transport networks and nodes concepts are currently being widely studied: fixed ITU-T wavelength channel grids could be substituted by flexible fiber spectrum and allocation and reservation mechanisms to remove guard-bands and free up more spectrum for information transmission.

In this vision, management of amplifiable spectrum in fiber optics will become more similar to air spectrum management in radio: intelligence in the network will be able to allocate for transmission wavelength "bands" having the minimum possible extension to meet the transmission distance target, and to configure the characteristics of a "flexible transponder" to match the characteristics of the established light path.

A "flexible transponder" will be able to adapt its bit rate by changing the number of sub-carriers used to convey information as well as their modulation format and baud rate. A "flexible transponder" could never use fixed OTU frame structures, but the features of OTU-framing are still important for network operation, administration, troubleshooting and maintenance purposes.

At least some embodiments of the present invention allow the transport of the ODUflex over a new OTUflex signal with a "flexible" bit-rate and without the need of the mapping into an intermediate HO-ODUk. The resizing of the ODUflex is always allowed in steps of 1.25 G tributary slots as supported today by G.Hao.

This new OTUflex signal can have some modifications in the OTUflex OH, if compared to the standard OTUk one, to host the 'modified' link resizing protocol. Furthermore it is proposed to enhance/simplify the present G.Hao/G.7044 resizing protocol so that every Line card along the path will be able to get the information of the bit-rate of the incoming OTUflex and will be therefore able to retune its optical transceiver to work at the optimized bit rate.

Figure 2:
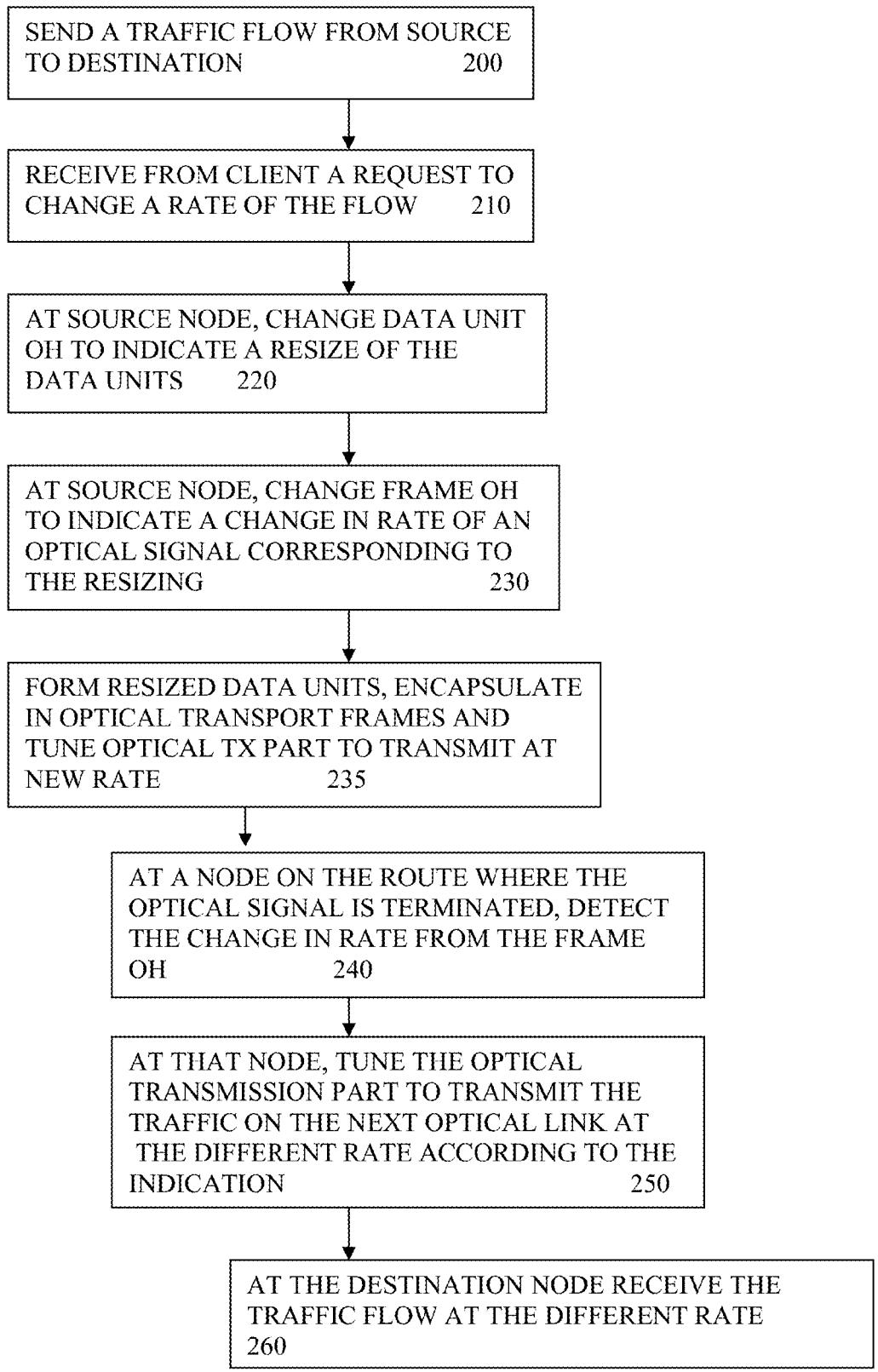
FIG. 2 shows some steps carried out by the nodes according to an embodiment.

FIGS. 1, 2, Nodes for a First Embodiment

FIG. 1 shows a schematic view of a number of nodes according to an embodiment. A first node acts as a source node 10 for a particular traffic flow from a client. A second node acts as an intermediate node 20 along the path. A third node acts as a destination node 30 for the path. In a typical path there could be many more nodes along the path. At the source node the data from the client is formed into data units by a data unit processor 40. Data unit overhead is added here also. The data units with overhead are passed to a framer 50 where a number of the data units are encapsulated by optical transport frames, each having a frame overhead associated with the optical link carrying the traffic flow. A tuning control part 60 is able to tune the rate of a tunable optical transmitter 70 based on overhead information to enable the optical link to operate at a rate matched to any resizing of the data units. The different parts can be implemented in various ways, on the same chip or different chips or different cards and so on.

In the intermediate node there is an optical receiver 80, a frame reader 90, a data extraction part 100, a switch part 110, and a similar transmit chain to that of the source node, having a tunable optical transmitter 70, a tuning control part 60, a framer 50 and data unit processor 40. The frame reader takes off the frame overhead, the data extract part receives data units, and feeds them to the switch. The data unit processor 40 reforms the data units with refreshed overhead, and the framer adds the frame overhead as before. The tuning control part 60 is able to tune the rate of its tunable optical transmitter 70 based on overhead information to enable the next optical link to operate at a rate matched to any resizing of the data units.

If needed, the tuning control part can also tune the optical receiver 80 to receive the new rate.

At the destination node there is an optical receiver 80, a frame reader 90, and a data extraction part 100. The data extraction part extracts the data units from the signal to feed to the client. If needed, a tuning control part can be provided to tune the optical receiver 80 to receive the new rate.

FIG. 2 shows some of the steps in adapting the rate of the optical links to changes in the rate of data sent by the client entity. At step 200, a traffic flow is sent from the source to the destination. This path can be set up in various ways. Typically the source node receives from a network management system for example a path list of nodes, optionally a list of wavelength assignments and other information as needed such as regeneration locations. The network management system can in some cases communicate directly with each of the nodes along the path to set up the route. In other cases the source node can set up the path using in band messages as follows.

To reserve a path, an RSVP-TE (Traffic Engineering) PATH message, in the form of a Generalized Label Request, is sent out from the source node (which acts as an ingress node) via intermediate nodes along the proposed path, to the destination node (acting as an egress node).

The intermediate node or nodes each reserve the resources needed for the path and pass the message. The egress node returns an RSVP-TE RESV message to the ingress node if no nodes have rejected the message, back along the path to cause the nodes along the path to confirm the reservation of resources such as bandwidth on switch paths and ports, for the requested path, for traffic of a signal type specified in the message. The intermediate node passes on this message and sets up the path using the reserved resources, but with an appropriate status to indicate no traffic is flowing on the path yet. If this return message is received at the source node, then the source node can assume the path is ready at step 460.

The Generalized Label Request is a message used by RSVP-TE for the signaling of a Label Switched Path (LSPs) on any kind of network technology. It is defined in RFC3471 and extended in RFC 4328 in order to support G.709 OTN architecture. It includes a common part (i.e., used for any switching technology) and a technology dependent part (i.e., the traffic parameters).

At step 210, the source node receives a request to change the rate, or detects a change in rate of the flow. At the source node, the data unit overhead is changed to indicate the resize at step 220. The frame overhead is then changed at the framer in source node to indicate a change of rate of the optical signal to correspond to the resizing of the data units. At step 235, the resized data units are formed by the data unit processor and are encapsulated in optical transport frames by the framer. Optionally this step can await the result of a check that all the nodes have the capability to handle the new size and rate. Many examples of ways of implementing the check can be envisaged, some are shown in embodiments described below. In other examples a centralized entity can carry out checks using a model of the network. The optical transmission part is retuned by the tuning control part to transmit at the new rate, calculated to correspond to the resizing.

At each intermediate node, where the optical signal is terminated, the frame overhead is read and the change in rate is detected from the frame overhead at step 240. At that node, the optical transmission part for transmitting to the next node is then tuned to transmit at the new rate, based on the indication detected in the received frame overhead at step 250. At the destination node, the traffic flow is received at the new rate and leaves the network to go to the destination client entity.

Figure 3:
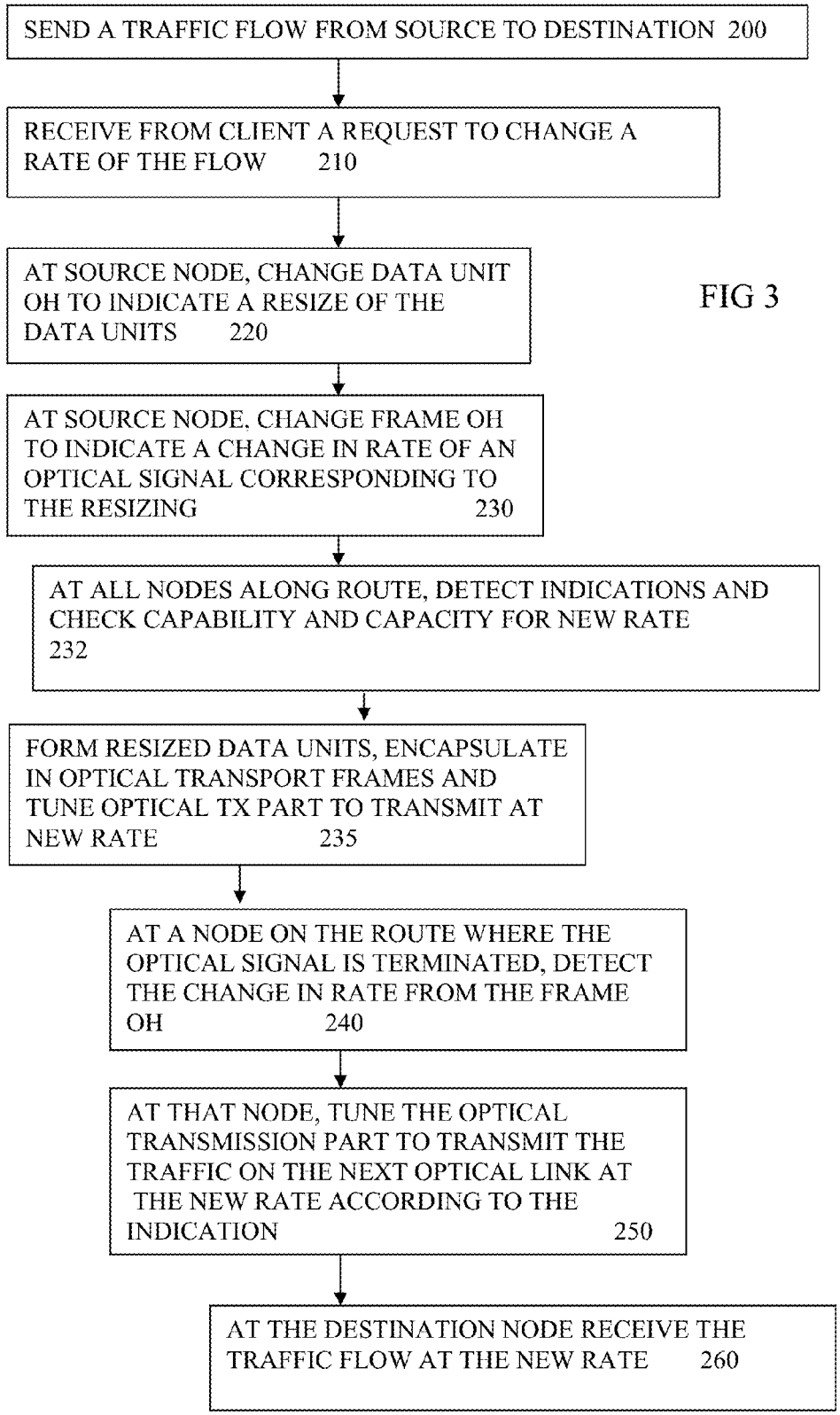
FIG. 3 shows some steps carried out by the nodes according to another embodiment involving checking capability and capacity at intermediate nodes.

FIG. 3, Checking Intermediate Nodes Before Changing the Rate.

FIG. 3 shows some steps carried out by the nodes according to another embodiment similar to that of FIG. 2 and involving checking capability and capacity at intermediate nodes. As in FIG. 2, at step 200, a traffic flow is sent from the source to the destination. At step 210, the source node receives a request to change the rate, or detects a change in rate of the flow. At the source node, the data unit overhead is changed to indicate the resize at step 220. The frame overhead is then changed at the framer in source node to indicate a change of rate of the optical signal to correspond to the resizing of the data units. Before the step 235 of forming and sending the resized data units at the new rate, there is a step 232 of detecting at the intermediate nodes the indications sent in the overhead that a change in rate is intended or requested. At these intermediate nodes there is a check made that the node has capability for the new rate and capacity in the switch and the optical transmission part (typically implemented as line cards). If any intermediate nodes report back to the source node that they do not have capacity, or if they do not respond or do not send on the indication, then the source node does not carry on with the rate change.

Otherwise, as in FIG. 2, at step 235 the resized data units are formed by the data unit processor and are encapsulated in optical transport frames by the framer. The optical transmission part is retuned by the tuning control part to transmit at the new rate, calculated to correspond to the resizing. Step 240, 250 and 260 proceed as described above for FIG. 2. Other ways of implementing the check that the nodes can carry out the change in rate can be envisaged. It might be carried out by querying a model of the network, or as a preliminary step when the route is set up.

Figure 4:
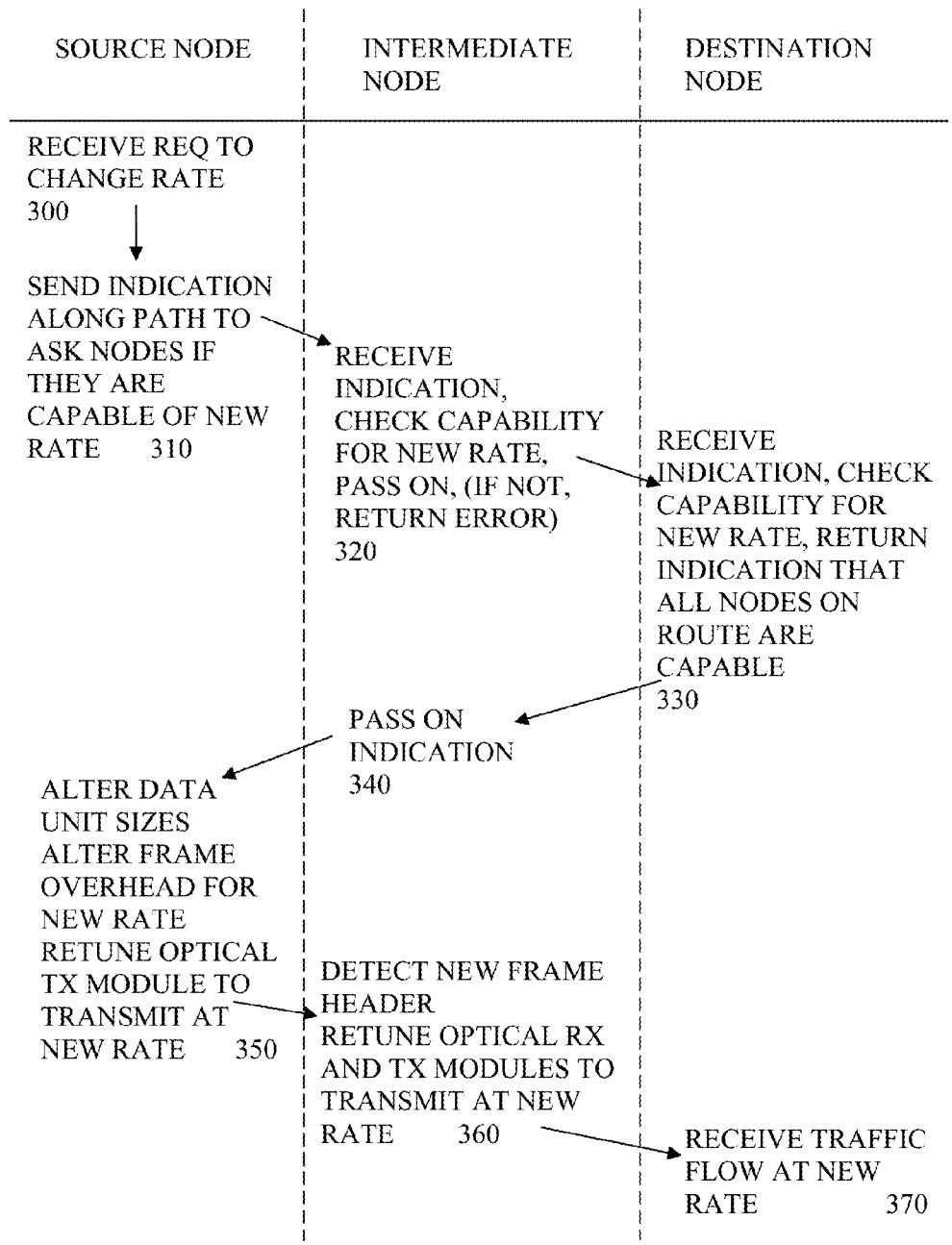
FIG. 4 shows a time chart of steps by the nodes according to an embodiment involving checking capability at nodes and sending back an indication before retuning.

FIG. 4, Time Chart for Actions of Nodes to Check Capability Before Resize

FIG. 4 shows a time chart of steps by the nodes according to an embodiment involving checking capability at nodes and sending back an indication before implementing the resizing and retuning of the optical transmitters at each node along the path. A left hand column shows steps of the source node 10, a middle column shows steps of the intermediate node 20 and a right column shows steps of the destination node 30. Time flows down the chart. At step 300 the source node receives the request to change the rate. At step 310, if the source node is capable of the new rate, it then sends an indication of the intended new rate on to other nodes along the path. Each intermediate node receives the indication at step 320, checks whether it has the capability and if so, passes the indication along to the next node. If it does not have the capability or capacity, it can return an error message to the source, or may simply not pass the indication on. The destination node receives the indication at step 330, checks it has capability for the new rate and returns an indication back along the path that all nodes along the route are capable and have capacity for the new rate.

At step 340 this indication is passed on by each of the intermediate nodes to the source node. At the source node, at step 350, the rate change is implemented. Data units are formed with the new size, and the frame overhead is altered. The optical transmission part is retuned to the new rate, and the resized data units are transmitted along the path. At step 360, at each intermediate node, the new frame header is detected and the optical receiver is retuned to the new rate and transmitter part is now retuned to transmit at the new rate. At step 370 the destination node receives the traffic flow at the new rate.

FIG. 5, Node View

Figure 5:
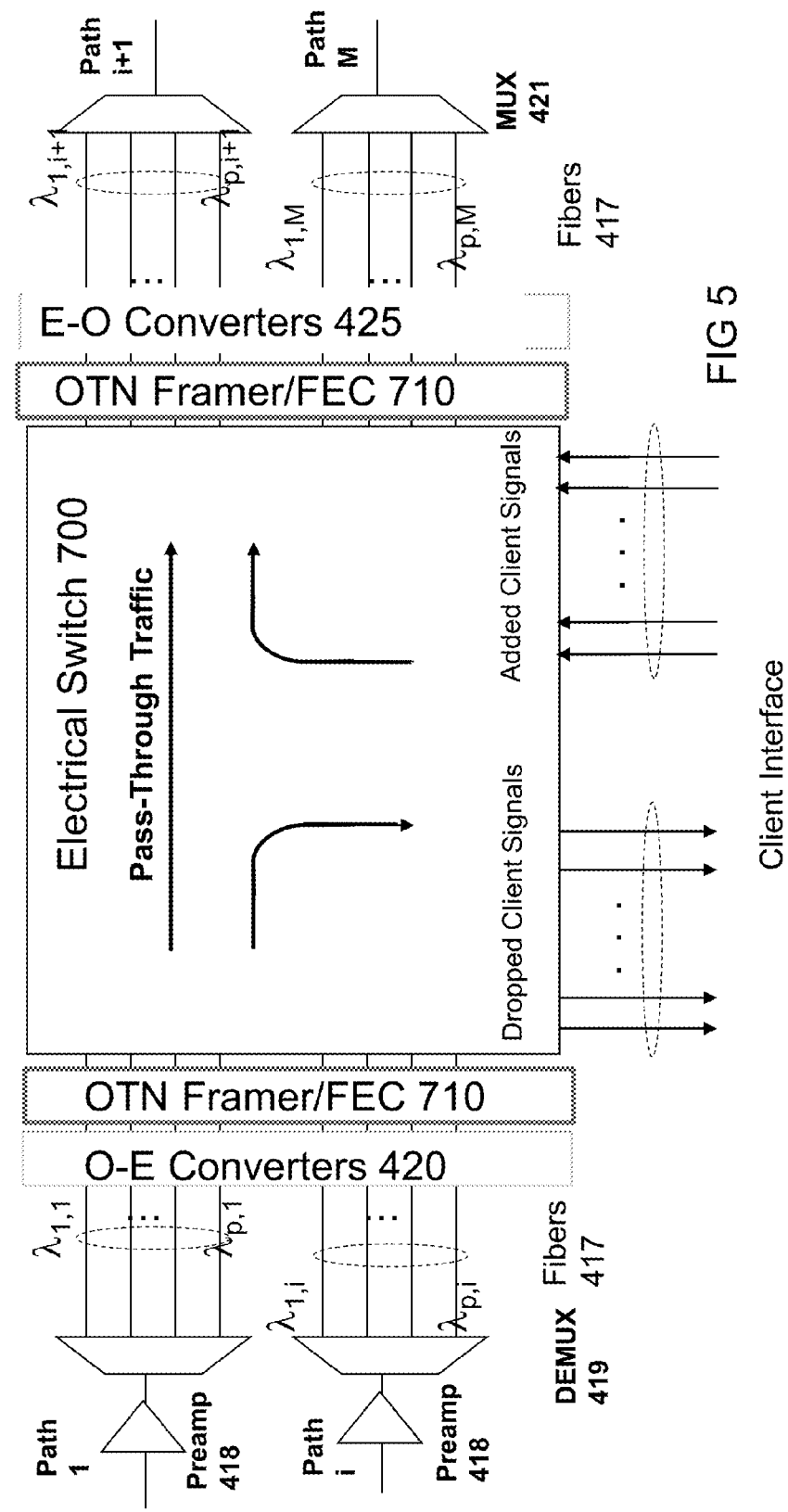
FIG. 5 shows a schematic view of an example of a node having a framer and an electrical switch.

FIG. 5 shows a schematic view of an example of a node having a framer and an electrical switch, for use as a source node, intermediate node or destination node in the embodiments described. To enable reconfiguring the wavelength paths to be dropped or added at different nodes, network nodes having optical switches can be provided, known as all optical ROADM (Reconfigurable Optical Add Drop Multiplexer) nodes. The node shown is a ROADM and has an electrical switch 700 arranged to pass through traffic or to add or drop traffic to an add drop interface in the form of a client interface. The switch is coupled to multiple incoming optical paths 1 ... i. Each path can carry a WDM signal which is fed to an optical preamplifier 418 then a wavelength demultiplexer 419. In WDM, DWDM and other optical networks, arrayed waveguide gratings (AWGs), interleavers, and/or fiber gratings (FGs) can be used to add and drop traffic at network nodes and to multiplex and demultiplex traffic at network nodes. To enable reconfiguring the wavelength paths to be dropped or added at different nodes, network nodes having optical switches can be provided. Separated wavelengths are each fed on separate fibers 417 to input converters in the form of optical to electrical converters 420. The individual electrical signals are all fed to a framer 710 in the form of circuitry for OTN frame processing including FEC processing for example. The signal is then switched by the switch, either to pass through or to be dropped to the client interface.

Another framer 710 is provided at the output of the switch for processing signals corresponding to all the wavelengths to be output onto output optical paths i+1 ... M. Clearly there need not be the same number of outputs as inputs. After the OTN frame processing, the output electrical signals are fed to the optical transmission part in the form of output converters 425 and multiplexer 421. Optical signals at individual wavelengths are multiplexed into a WDM optical signal by multiplexer 421. The clock rate of the digital signals converted to optical signals by the converters 425 can be tuned according to embodiments, to tune the rate of the optical transmission. In principle this can take place at the output of the framer. The framer can be arranged to incorporate the data unit processor for electrical processing of data units and for example carry out any of:

Full SONET/SDH TOH processing of OC-768 and OC-192 signals (termination and generation)
Full G.709 compliant OxU2 and OxU3 overhead termination and generation
Asynchronous aggregation of four independent 10G class signals into a standard or an over-clocked OTU3
10GE LAN/WAN, FC-1200, and FC800 non-intrusive Performance Monitoring
Fully transparent and asynchronous mapping of one 40 Gbps or four 10 Gbps tributaries into an OTU3 or four independent OTU2s FEC is the last part added to the frame before the frame is scrambled. The frame has four rows. Each row is broken down into 16 sub-rows comprised of 255 bytes each. A sub-row is composed of interleaved bytes so that the first sub-row contains the first overhead (OH) byte, the first payload byte and the first FEC byte, and so on for the remaining sub-rows of each row in the frame. The first FEC byte starts at position 240 for all sub-rows. The FEC uses a Reed-Solomon RS (255/239) coding technique. This means that 239 bytes are required to compute a 16-byte parity check. The FEC can correct up to eight (bytes) errors per sub-row (codeword) or detect up to 16 byte errors without correcting any. Combined with the byte interleave capability included in ITU G.709 implementation, the FEC is more resilient to error burst, where up to 128 consecutive bytes can be corrected per OTU frame row. Various ways of sending the requests for transmission clock rate changes along the path can be envisaged.

FIGS. 6 to 9, OTUflex Frame

Figure 6:
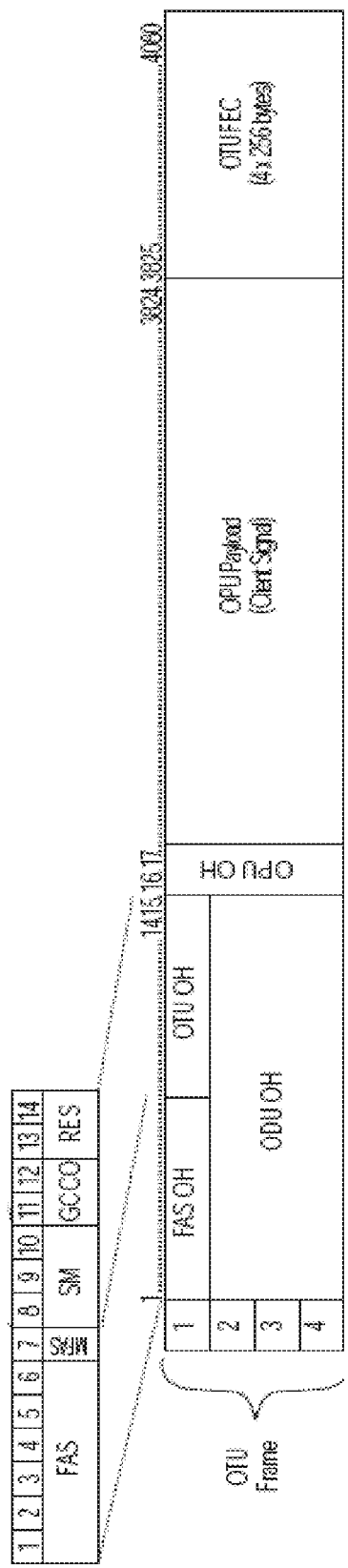
FIG. 6 shows a schematic view of an OTU frame and OTU overhead for use in an embodiment.

FIG. 6 shows a schematic view of an OTU frame and OTU overhead for use in an embodiment. The OTUflex frame format can be simply an extension of the ODUflex as the OTUk is the extension of the ODUk as specified in G.709. The OTUflex frame structure can be based on the ODUflex frame structure with a forward error correction (FEC) and OTU OH.

As shown in FIG. 6, a frame has four rows, and the OTU overhead is comprised of SM, GCC0 and RES bytes, after the frame alignment bytes FASOH, and starting at row 1 column 8. The section monitoring (SM) bytes are used for the trail trace identifier (TTI), parity (BIP-8) and the backward error indicator (BEI), or backward incoming alignment error (BIAE), backward defect indicator (BDI), and incoming alignment error (IAE).

General communication channel 0 (GCC0) is a clear channel used for transmission of information between OUT termination points. The reserved (RES) bytes are currently undefined in the standard. Hence these bytes, located at row 1, column 13 or 14 of the OTUk frame could be used for sending the above mentioned messages related to changing the rate. FIG. 6 also shows the FEC bytes at the end of each row of the frame in the ITU G.709 standard.

Figure 7:
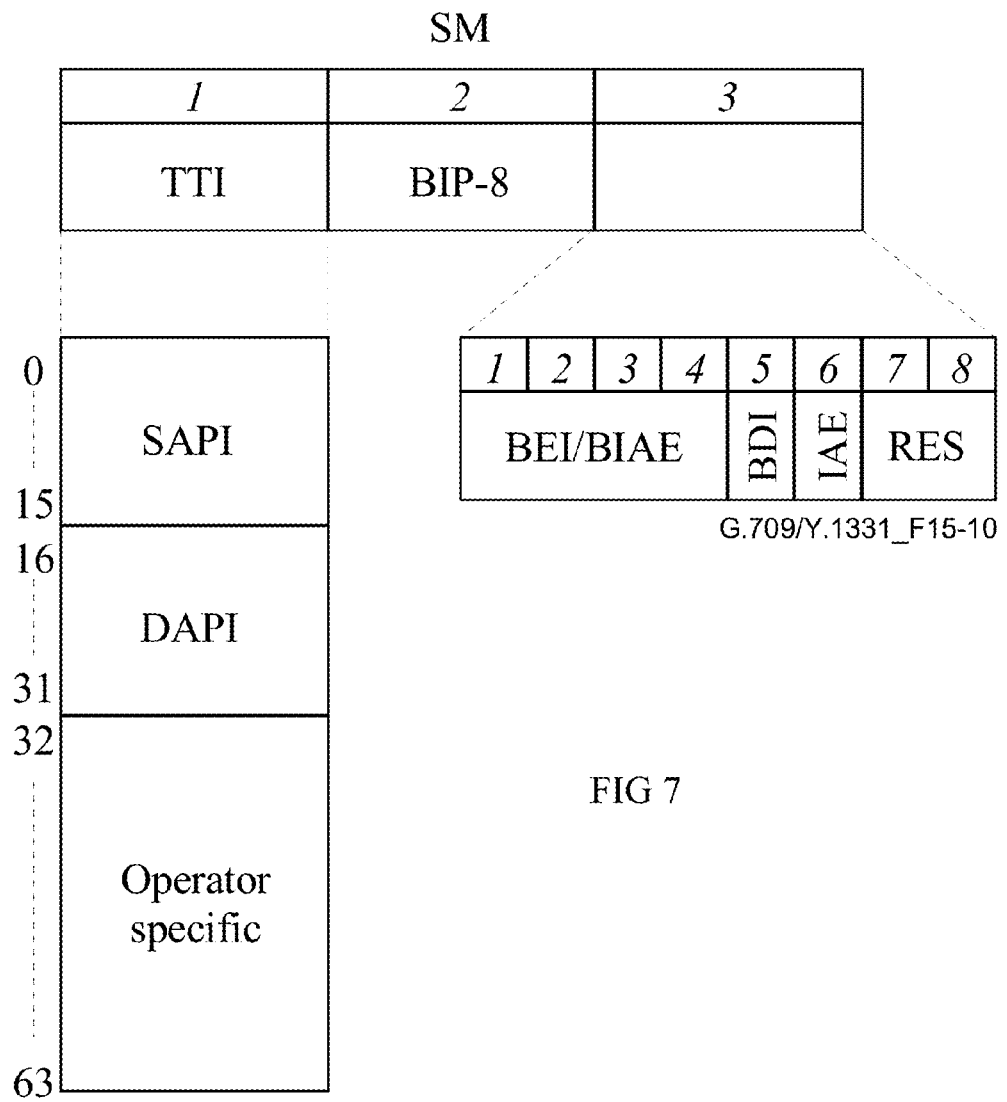
FIG. 7 shows a schematic view of an ODU frame and ODU overhead for use in an embodiment.
Figure 8:
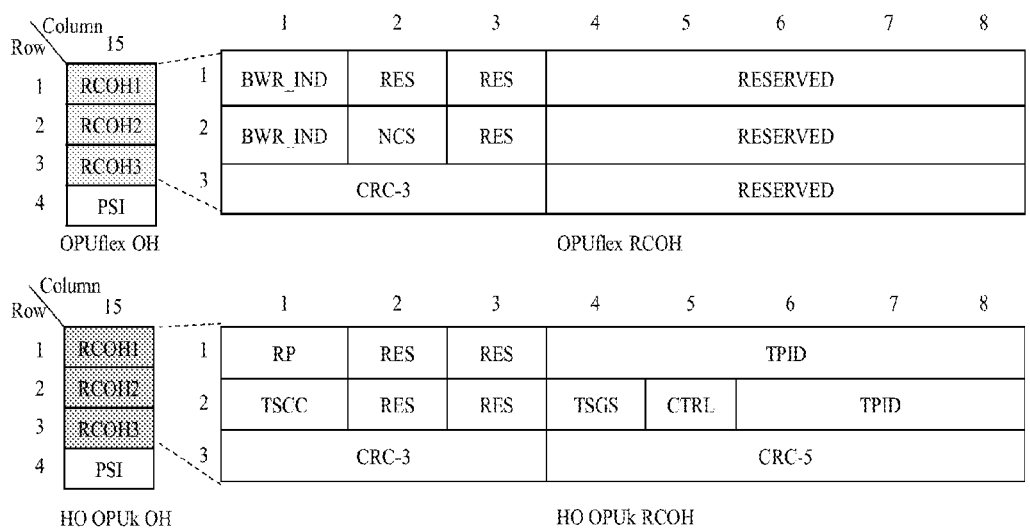
FIG. 8 shows a schematic view of overhead information for a conventional scheme using higher order multiplexing.

The OTUflex overhead location is shown in more detail in FIG. 7. As specified in the following section the OTUflex OH must be modified in order to allow the transport of the ODUflex LCR resizing protocol. As described above in the OTUk OH today are available: Two RES bytes (See FIG. 6); and two RES bits in the SM byte. FIG. 8 shows fields used for the HO OPUk Resize Control Overhead (RCOH), compared to those used in the OPUflex RCOH. At present, as defined in G.Hao the LCR protocol requires 12 bits plus some CRC for checking (See fields in FIG. 8):

1×RP bit;
1×TSCC bit;
1×TSGS bit;
1×CTRL bit;
8×TPID bits;
3×CRC-3 bits;
5×CRC-5 bits;

In order to have an LCR protocol as similar as possible to the one already defined in G.Hao, the above 12 bits are still necessary even in case of LCR for the resizing of an ODUflex transported via OTUflex.

If the two RES bytes of the OTUk OH are used, then 6 bits are available to indicate the number of tributary slots (TSNUM) by which the ODUflex will increase or decrease (as described in the following). The enhanced LCR in this proposal will thus be able to support an increment/decrement of up to 64 TS per time.

Figure 9:
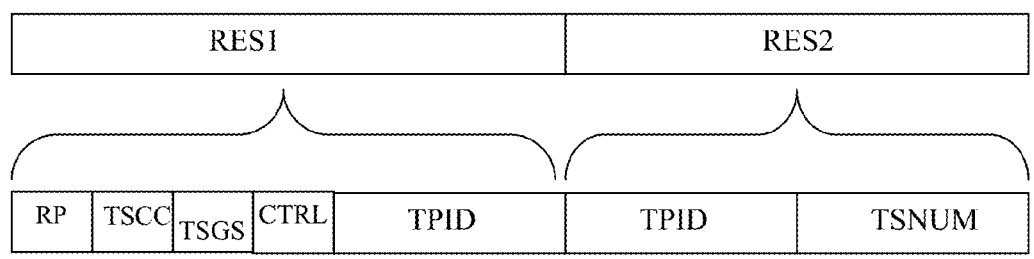
FIG. 9 shows a schematic view of overhead information according to an embodiment.

FIG. 9 shows one possible arrangement of the fields to enable transport of the 'enhanced' LCR inside the RE1S1/RES2 bytes. This shows RES 1 is used to carry the RP bit, the TSCC bit, the TSGS bit, the CTRL bit, and 4 TPID bits. RES2 is used to carry 4 TPID bits and 4 bits if TSNUM. In the above proposal CRC checking is missing. For such purpose one of the GCC0 bytes could be re-used.

Furthermore G.709 can be enhanced adding the following tables as well.

TABLE 1

OTUflex types and bit rates

| OTU type | OTU nominal bit rate | OTU bit-rate tolerance |
| --- | --- | --- |
| OTUflex for CBR client signals | 239/238 × client signal bit rate | client signal bit rate tolerance, with a maximum of ±100 ppm |
| OTUflex for GFP-F mapped client signals | configured bit rate (see Table 7-8 in G.709) | ±20 ppm |

TABLE 2

OTUflex/ODUflex/OPUflex frame periods

| OTU/ODU/OPU type | Period (Note) |
| --- | --- |
| OTUflex/ODUflex/OPUflex | CBR client signals: 121856/client_signal_bit_rate GFP-F mapped client signals: 122368/ODUflex_bit_rate |

G.HAO Protocol Enhancement/Simplification

According to G.Hao-G.7044, the synchronization of changes in the capacity of an ODUflex connection is achieved by Resize Control Overhead (RCOH). The RCOH consists of fields dedicated to a specific function. The resizing protocol consists of two sub-protocols: Link Connection Resize (LCR) and Bandwidth Resize (BWR). In particular the LCR is in charge of checking if the link between two adjacent nodes is able to support the increase of the ODUflex of n×TS's.

As defined today in G.Hao, the RCOH is carried in the HO-OPUk Tributary Slot Overhead (TSOH) and in the OPUflex Overhead (See FIG. 8). Instead, according to some embodiments, the ODUflex is directly transported into an OTUflex without the intermediate multiplexing into an HO-ODUk, so the RCOH that is transported today by the three bytes of the HO-OPUk Tributary Slot Overhead (TSOH) is to be moved to the OTUflex OH.

At present the HO-OPUk is in charge of transporting the LCR. As defined today, when the two adjacent nodes (e.g. A and B) receive the command from the management system to increase the ODUflex of n×TS (e.g. n=2), including also the information of which TS of the HO-ODUk will be occupied by extension of the ODUflex (e.g. TS#5 and TS#9), they generate a specific LCR. This checks if TS#5 and TS#9 of the HO-ODUk in both directions (A→B, B→A) are available. Each node therefore generates n×LCR protocols (i.e. one for each TS to be incremented) to check the availability of the n×TS inside the HO-ODUk to "accept" the bandwidth increase of the ODUflex.

In case of OTUflex the LCR protocol is easier. Here we don't have the intermediate HO-ODUk therefore we don't need to check if there are available TS. The only check to do is if the XFP will be able to support the increase of the OTUflex bit-rate due to the bandwidth increment of the ODUflex of n×TS.

One single LCR protocol is enough to check if the n×TS increment is possible, instead of n× independent LCR protocols (i.e., one per each TS to be incremented, one per each specific TS of the OH-ODUk identified by the NMS) as required today by G.Hao.

Therefore in case of OTUflex the LCR is simpler (one single message for n×TS increase, instead of n×messages). Even the amount of information needed from the user/NMS is less: it is enough to know the number of TS to be incremented.

It is not necessary that the operator specifies the exact position inside the HO-ODUk that will be occupied by the "new" TS of the ODUflex.

As described, at least some embodiments can help enable the operator of an OTN cloud or OTN layer of a network to manage ODUflex services, to improve transmission across the network both in terms of power consumption and optical bandwidth utilization, especially for networks having a flexible or gridless bandwidth scheme.

Figure 10:
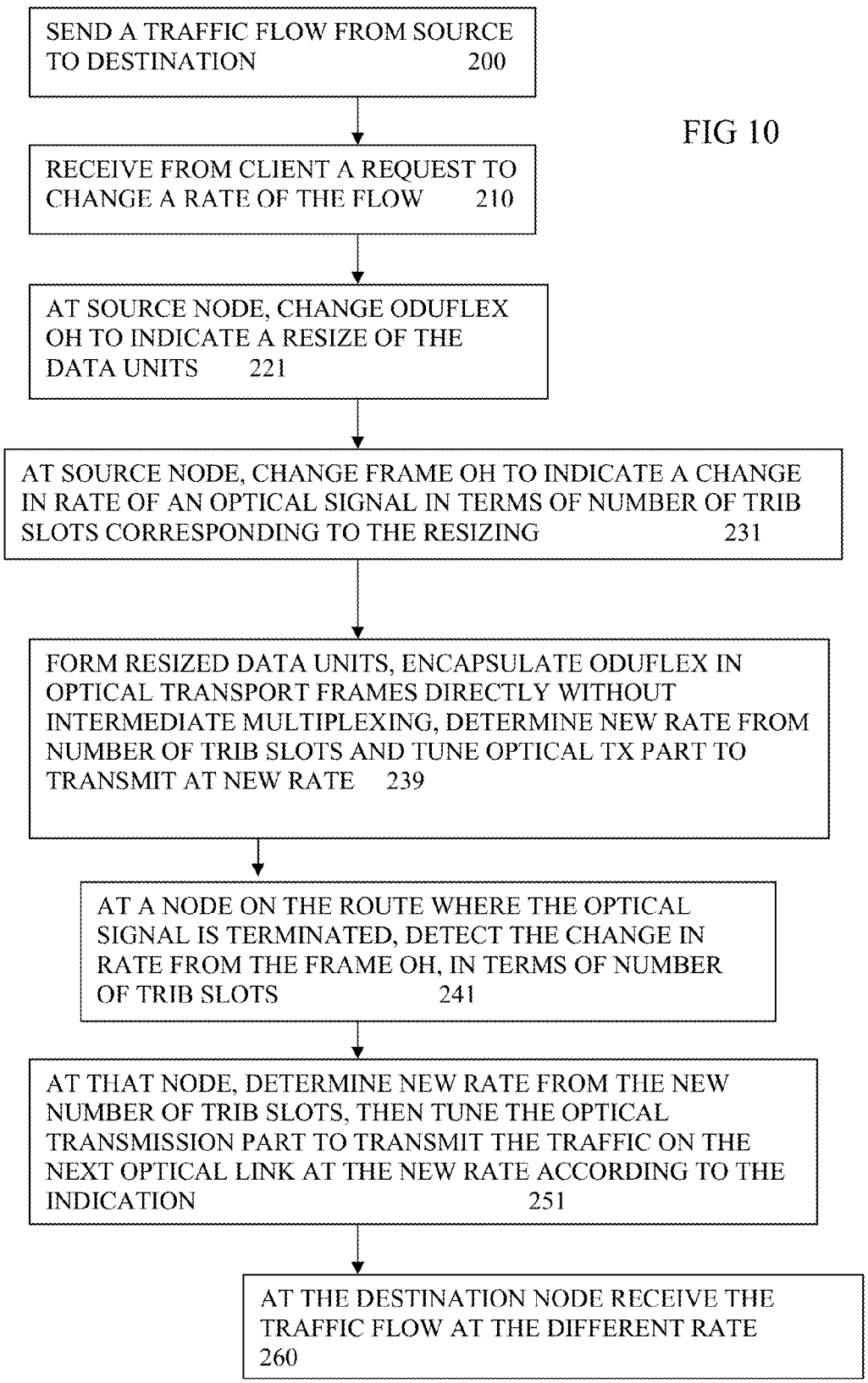
FIG. 10 shows some steps carried out by the nodes according to another embodiment involving encapsulating ODUflex in OUT frame overhead, and indicating the new rate in the form of a new number of trib slots.

FIG. 10, Embodiment Indicating Rate by Number of Trib Slots

FIG. 10 shows some steps carried out by the nodes according to another embodiment similar to that of FIG. 2 and involving encapsulating ODUflex in OTU frame overhead, and indicating the new rate in the form of a new number of trib slots. As in FIG. 2, at step 200, a traffic flow is sent from the source to the destination, using ODUflex data units. At step 210, the source node receives a request to change the rate, or detects a change in rate of the flow. At the source node, the ODUflex data unit overhead is changed to indicate the resize at step 221. The frame overhead is then changed at the framer in the source node to indicate a change of rate of the optical signal to correspond to the resizing of the data units at step 231, in terms of a number of trib slots. The resized ODUflex data units are formed by the data unit processor and are encapsulated in optical transport frames by the framer at step 239. This is done directly without intermediate higher order multiplexing. In some cases as explained above, this resizing and encapsulating may await the check that all the nodes are able to carry out the resizing and accept and transmit the new rate. The optical transmission part is retuned by the tuning control part to transmit at the new rate, calculated from the indicated number of trib slots to correspond to the resizing.

At each intermediate node, where the optical signal is terminated, the frame overhead is read and the change in rate is detected by calculation based on the trib slot number in the frame overhead at step 241. At that node, the new rate is calculated from the trib slot number and the optical transmission part for transmitting to the next node is then tuned to transmit at the new rate, at step 251. At the destination node, the traffic flow is received at the new rate and leaves the network to go to the destination client entity at step 260.

FIG. 11, Embodiment Involving Changing Bandwidth Assignment

FIG. 11 shows some steps carried out by the nodes according to another embodiment involving changing a bandwidth assignment. As in FIG. 2, at step 200, a traffic flow is sent from the source to the destination. At step 210, the source node receives a request to change the rate, or detects a change in rate of the flow. At the source node, the data unit overhead is changed to indicate the resize at step 220. The frame overhead is then changed at the framer in source node to indicate a change of rate of the optical signal to correspond to the resizing of the data units. At step 237 the resized data units are formed by the data unit processor and are encapsulated in optical transport frames by the framer. In some cases, if needed to ensure reliability, this step can await a result of a check that all the nodes are able to carry out the resizing and accept and transmit the new rate. The optical transmission part is retuned by the tuning control part to transmit at the new rate, calculated to correspond to the resizing, and using the new bandwidth assignment. Step 240, 250 and 260 proceed as described above for FIG. 2. The new bandwidth assignment can involve an increase in slot width without moving to a new slot, or can involve moving to a new band, which implies a different light colour. The latter may need to be explicitly signaled to the intermediate nodes which could in principle be carried out in the frame overhead, or by a separate message passing process between the nodes, or by messages passed from a network management system.

As has been described, in an optical transport network a traffic flow comprises data grouped into a number of resizable data units, encapsulated by optical transport frames, each having a frame overhead. A rate of the traffic flow is changed by changing the data unit overhead and changing at the source node the frame overhead to indicate a change in rate of an optical signal carrying the traffic flow. An optical transmission part is tuned to transmit at the new rate, and at any intermediate nodes along the route the indication of the change in rate is detected in the frame overhead so that the traffic flow on a next optical link is transmitted at the new rate. Thus optical bandwidth allowed for enlarging the data units, can be saved, and electrical processing of data units at the nodes can be simplified, reducing power consumption. Other variations can be envisaged within the scope of the claims.

What is claimed is:

1. A method of operating an optical transport network, the method comprising:
   sending a traffic flow along a route through nodes of the optical transport network from a source node to a destination node over one or more optical links, the traffic flow comprising data grouped into a number of G.709 Flexible Optical Data Unit (ODUflex) frames, each ODUflex frame having an ODUflex overhead, at least one of the nodes having switches arranged to route the ODUflex frames, a number of the ODUflex frames being encapsulated by optical transport frames, each having a frame overhead associated with the optical link carrying the traffic flow; and
   changing a rate of the traffic flow by:
      at the source node, changing the ODUflex frame overhead to indicate a resize of the ODUflex frames to one of the switches along the route,
      changing at the source node the frame overhead to indicate a change in rate of an optical signal carrying the traffic flow to one of the nodes along the route which terminate an optical link, the change in rate corresponding to the resize of the ODUflex frame,
      at the source node, grouping the data of the traffic flow into the resized ODUflex frames, encapsulating the resized ODUflex frames directly with optical transport frames, without encapsulating the resized ODUflex frame with any intermediate frame, and tuning an optical transmission part to transmit the optical transport frames in an optical signal at a new rate corresponding to the change in rate, wherein the new rate comprises a new number of trib slots (TSNUM),
      detecting at one of intermediate nodes along the route which terminate the optical signal, the indication of the change in rate in the frame overhead of the traffic flow from the source node,
      in response to the detection of the indication of the change in rate in the frame overhead of the traffic flow from the source node, sending, by the one of the intermediate nodes, a response to the source node, the response causing the source node to perform the change in rate corresponding to the resize of the ODUflex frames, and
      tuning an optical transmission part of that intermediate node to transmit the traffic flow on a next optical link along the route at the new rate according to the indication of the change in rate.

2. The method of claim 1, further comprising checking that the nodes along the route can carry out the change in rate before transmitting the optical signal from the source node at the new rate.

3. The method of claim 1, further comprising:
   before transmitting the optical transport frames at the new rate from the source node:
      sending the indication of the change in rate to all the nodes along the route;
      checking at each node that there is a capability for the new rate; and
   waiting until the source node receives an acknowledgement from the destination node that all nodes have the capability.

4. The method of claim 3, wherein changing the frame overhead comprises adding resize control overhead, and checking is carried out in a hitless manner according to G.Hitless Adjustment of Flexible Optical Data Unit (ODUflex)-G.7044 (G.Hao-G.7044) adapted to use the resize control overhead in the frame overhead.

5. The method of claim 1, wherein at least one of the optical links of the network has a flexible grid of bandwidth assignments, and the method further comprises reassigning bandwidth according to the indicated change in rate.

6. The method of claim 1, wherein tuning comprises one or more of changing a modulation format, changing a baud rate, and changing a number of sub-carriers used in a multi-carrier modulation format.

7. The method of claim 1, wherein detecting the indication of the new rate further comprises:
   detecting the new number of trib slots; and
   using the new number of trib slots to determine the new rate.

8. A method of operating a source node of an optical transport network, the method comprising:
   sending a traffic flow along a route through nodes of the optical transport network from the source node to a destination node over one or more optical links, the traffic flow comprising data grouped into a number of G.709 Flexible Optical Data Unit (ODUflex) frames, each ODUflex frame having an ODUflex frame overhead, at least one of the nodes having switches arranged to route the ODUflex frames, a number of the ODUflex frames being encapsulated by optical transport frames, each having a frame overhead associated with the optical link carrying the traffic flow; and
   changing a rate of the traffic flow by:
      at the source node, changing the ODUflex frame overhead to indicate a resize of the ODUflex frames to one of the switches along the route,
      changing at the source node the frame overhead to indicate a change in rate of an optical signal carrying the traffic flow to one of the nodes along the route which terminate an optical link, the change in rate corresponding to the resize of the ODUflex frames, and
      at the source node, grouping the data of the traffic flow into the resized ODUflex frames, encapsulating the resized ODUflex frames directly with optical transport frames, without encapsulating the resized ODUflex frames with any intermediate frame, and tuning an optical transmission part to transmit the optical transport frames in an optical signal at a new rate corresponding to the change in rate, wherein the new rate comprises a new number of trib slots (TSNUM).

9. A method of operating an intermediate node of an optical transport network in which a traffic flow has been sent along a route through nodes of the optical transport network from a source node to a destination node over one or more optical links, the traffic flow comprising data grouped into a number of G.709 Flexible Optical Data Unit (ODUflex) frames, each ODUflex frame having an ODUflex frame overhead, at least one of the nodes having switches arranged to route the ODUflex frames, a number of the ODUflex frames being encapsulated by optical transport frames without being encapsulated by any intermediate frame, each optical transport frame having a frame overhead associated with the optical link carrying the traffic flow, and a rate of the traffic flow has been changed by changing the ODUflex frame overhead to indicate a resize of the ODUflex frames to one of the switches along the route, and changing the frame overhead to indicate a change in rate of an optical signal carrying the traffic flow to any nodes along the route which terminate an optical link, the change in rate corresponding to the resize of the ODUflex frames, the method comprising:

detecting at the intermediate node along the route, the indication of the change in rate in the frame overhead of the traffic flow from the source node;
 in response to the detection of the indication of the change in rate in the frame overhead of the traffic flow from the source node, sending, by the intermediate node, a response to the source node, the response causing the source node to perform the change in rate corresponding to the resize of the ODUflex frames; and
 tuning an optical transmission part of that intermediate node to transmit the traffic flow on a next optical link along the route at a new rate according to the indication of the change in rate, wherein the new rate comprises a new number of trib slots (TSNUM).

10. A node for an optical transport network operable as a source node for a traffic flow along a route through nodes of the optical transport network from the source node to a destination node over one or more optical links, the traffic flow comprising data grouped into a number of G.709 Flexible Optical Data Unit (ODUflex) frames, each ODUflex frame having an ODUflex frame overhead, at least some of the nodes having switches arranged to route the ODUflex frames, a number of the ODUflex frames being encapsulated by optical transport frames, each having a frame overhead associated with the optical link currently carrying the traffic flow, the node comprising:

a data unit processor arranged to respond to a request to change a rate of the traffic flow by changing the ODUflex frame overhead to indicate a resize of the ODUflex frames to one of the switches along the route;
 a framer arranged to:
  change the frame overhead to indicate a change in rate of an optical signal carrying the traffic flow to one of the nodes along the route which terminate an optical link, the change in rate corresponding to the resize of the ODUflex frames,
  group the data of the traffic flow into the resized ODUflex frames, and
  encapsulate the resized ODUflex frames directly with optical transport frames, without encapsulating the resized ODUflex frames with any intermediate frame; and
 a tunable optical transmission part arranged to transmit the traffic flow on a next optical link along the route at a new rate corresponding to the change in rate, wherein the new rate comprises a new number of trib slots (TSNUM).

11. The node of claim 10, wherein the tunable optical transmission part is tunable by changing one or more of: a modulation format, a baud rate, and a number of sub-carriers used in a multi-carrier modulation format.

12. The node of claim 10, wherein the tunable optical transmission part is further arranged to, before transmitting the frames at the different new rate, send an indication of the change in rate to all the nodes along the route, and to wait until an acknowledgement is received from the destination node that all the nodes along the route have a capability for the new rate.

13. A node for an optical transport network operable as an intermediate node for a traffic flow along a route through nodes of the optical transport network from a source node to a destination node over one or more optical links, the traffic flow comprising data grouped into a number of G.709 Flexible Optical Data Unit (ODUflex) frames, each ODUflex frame having an ODUflex frame overhead, at least some of the nodes having switches arranged to route the ODUflex frames, a number of the ODUflex frames being encapsulated by optical transport frames without being encapsulated by any intermediate frame, each optical transport frame having a frame overhead associated with the optical link currently carrying the traffic flow, the node comprising:

a data extract part arranged to detect an indication in the ODUflex frame overhead of an incoming traffic flow to indicate a resize of the ODUflex frames,
 a frame reader arranged to detect in the frame overhead of the incoming traffic flow from the source node an indication of a change in rate of an optical signal carrying the traffic flow, the change in rate corresponding to the resize of the ODUflex frames, and in response to the detection of the indication of the change in rate in the frame overhead of the traffic flow from the source node, send a response to the source node, the response causing the source node to perform the change in rate corresponding to the resize of the ODUflex frames, and
 a tunable optical transmission part arranged to transmit the traffic flow on a next optical link along the route at a new rate according to the detected indication of the change in rate, wherein the new rate comprises a new number of trib slots (TSNUM).

14. The node of claim 13, wherein the frame overhead comprises resize control overhead, and the tunable optical transmission part is further arranged to check if the node has a capability corresponding to the new rate, and to pass on the frame overhead to a next node if the node has the capability.

15. The node of claim 14, wherein the tunable optical transmission part is further arranged to carry out the checking in a hitless manner according to G.Hitless Adjustment of Flexible Optical Data Unit (ODUflex)-G.7044 (G.Hao-G.7044) adapted to use the resize control overhead in the frame overhead.

16. The node of claim 13, further comprising a switch for switching the traffic flow according to the ODUflex frame overhead.

17. The node of claim 13, wherein the tunable optical transmission part is tunable by changing one or more of: a modulation format, a baud rate, and a number of sub-carriers used in a multi-carrier modulation format.

18. A non-transitory, computer readable storage medium that provides instructions that, if executed by a processor, will cause the processor to perform the operations for operating a source node of an optical transport network, the operations comprising:

sending a traffic flow along a route through nodes of the optical transport network from the source node to a destination node over one or more optical links, the traffic flow comprising data grouped into a number of G.709 Flexible Optical Data Unit (ODUflex) frames, each ODUflex frame having an ODUflex frame overhead, at least one of the nodes having switches arranged to route the ODUflex frames, a number of the ODUflex frames being encapsulated by optical transport frames, each having a frame overhead associated with the optical link carrying the traffic flow; and changing a rate of the traffic flow by:
at the source node, changing the ODUflex frame overhead to indicate a resize of the ODUflex frames to one of the switches along the route, changing at the source node the frame overhead to indicate a change in rate of an optical signal carrying the traffic flow to one of the nodes along the route which terminate an optical link, the change in rate corresponding to the resize of the ODUflex frames, and at the source node, grouping the data of the traffic flow into the resized ODUflex frames, encapsulating the resized ODUflex frames directly with optical transport frames, without encapsulating the resized ODUflex frames with any intermediate frame, and tuning an optical transmission part to transmit the optical transport frames in an optical signal at a new rate corresponding to the change in rate, wherein the new rate comprises a new number of trib slots (TSNUM).

19. A non-transitory, computer readable storage medium that provides instructions that, if executed by a processor, will cause the processor to perform the operations for operating an intermediate node of an optical transport network in which a traffic flow has been sent along a route through nodes of the optical transport network from a source node to a destination node over one or more optical links, the traffic flow comprising data grouped into a number of G.709 Flexible Optical Data Unit (ODUflex) frames, each ODUflex frame having an ODUflex frame overhead, at least one of the nodes having switches arranged to route the ODUflex frames, a number of the ODUflex frames being encapsulated by optical transport frames without being encapsulated by any intermediate frame, each optical transport frame having a frame overhead associated with the optical link carrying the traffic flow, and a rate of the traffic flow has been changed by changing the ODUflex frame overhead to indicate a resize of the ODUflex frames to one of the switches along the route, and changing the frame overhead to indicate a change in rate of an optical signal carrying the traffic flow to any nodes along the route which terminate an optical link, the change in rate corresponding to the resize of the ODUflex frames, the operations comprising:

detecting at the intermediate node along the route, the indication of the change in rate in the frame overhead of the traffic flow from the source node;

in response to the detection of the indication of the change in rate in the frame overhead of the traffic flow from the source node, sending a response to the source node, the response causing the source node to perform the change in rate corresponding to the resize of the ODUflex frames; and tuning an optical transmission part of that intermediate node to transmit the traffic flow on a next optical link along the route at a new rate according to the indication of the change in rate, wherein the new rate comprises a new number of trib slots (TSNUM).

* * * * *

UNITED STATES PATENT AND TRADEMARK OFFICE
CERTIFICATE OF CORRECTION

PATENT NO. : 9,118,585 B2  
APPLICATION NO. : 13/284146  
DATED : August 25, 2015  
INVENTOR(S) : Lanzone et al.

Page 1 of 1

It is certified that error appears in the above-identified patent and that said Letters Patent is hereby corrected as shown below:

In the Specification

In Column 2, Line 4, delete "1.238 G" and insert -- $\leq$1.238 G --, therefor.

In the Claims

In Column 18, Line 5, in Claim 12, delete "the different" and insert -- the --, therefor.

Signed and Sealed this  
Third Day of May, 2016

Michelle K. Lee  
*Director of the United States Patent and Trademark Office*